E. G. HARRIS.
DRY PIPE VALVE FOR SPRINKLER SYSTEMS.
APPLICATION FILED SEPT. 16, 1919.
1,343,776.
Patented June 15, 1920.
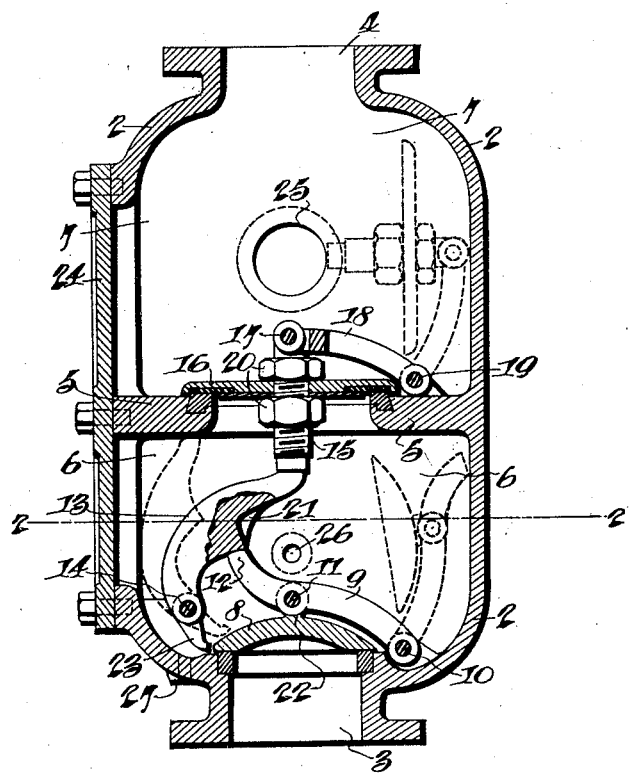
Fig. 1.
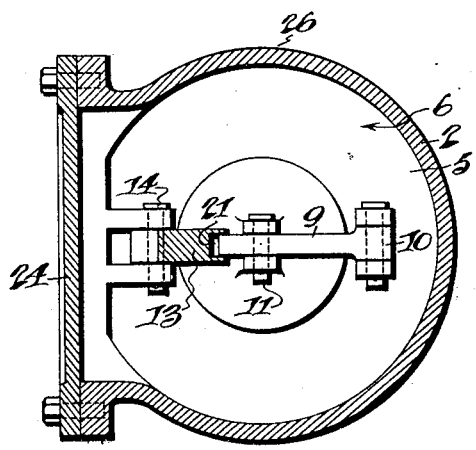
Fig. 2.
Inventor
Ernest G. Harris
By
Attorneys

UNITED STATES PATENT OFFICE.

ERNEST G. HARRIS, OF NORTH VANCOUVER, BRITISH COLUMBIA, CANADA.

DRY-PIPE VALVE FOR SPRINKLER SYSTEMS.

1,343,776.  Specification of Letters Patent.  Patented June 15, 1920.

Application filed September 16, 1919. Serial No. 324,170.

*To all whom it may concern:*

Be it known that I, ERNEST G. HARRIS, a subject of the King of Great Britain, residing at North Vancouver, in the Province of British Columbia, Canada, have invented certain new and useful Improvements in Dry-Pipe Valves for Sprinkler Systems, of which the following is a specification.

This invention relates to a straightway dry-pipe valve, as used to control the delivery of water to automatic sprinklers. To prevent injury by frost to the sprinkler pipes of a building, they are normally empty of water, and are charged with air under pressure, which, when allowed to escape, as when the sprinklers operate in the event of fire, permits the control valve to open and immediately fill the sprinkler pipes of the building with water.

As it is considered desirable to charge the sprinkler pipes with air at a less pressure than that of the water service, the air and water valves which control the admission of water to the sprinkler pipes may either have a difference of area corresponding to the difference of pressure between the air in the pipes and the water service, or a lever system must be applied between the valves enabling the pressure on the air valve to hold the water valve closed.

It is also considered desirable by the fire underwriters that the valves be in one alinement or be "straight-way" and when open the valves shall offer a clear unobstructed through passage for the water.

The valve, which is the subject of this application, has been designed to meet these several requirements and to generally conform to the demands of the Board of Fire Underwriters.

The invention is particularly described in the following specification, reference being made to the drawings by which it is accompanied, in which:

Figure 1 is a vertical longitudinal section through the device with the valves in the closed position, the open position of the valves being indicated by the dotted lines, and Fig. 2 is a sectional plan of the lower or water valve on the line 2—2.

In these drawings 2 represents the body or casing of the valve, 3 being the connection to the water service and 4 the connection to the sprinkler service of a building. Intermediate of the connections 3 and 4 the space within the body is divided by an axially apertured partition 5 into two chambers 6 and 7.

The aperture in the partition 5 is preferably relatively larger than that in the water connection 3, so as to offer a freer passage for the water, and incidentally to lessen the requirements of the lever control of the valve. The aperture through 5 has a white metal seat ring that seats upon a rubber-faced valve 16, the center of which is pin-connected at 17 to a link 18 which is pivotally mounted at 19 to the casing 2 of the valve, the pin-connection to the valve being made to the upper end of a threaded stem 15 through the axial center of the valve and retained in position by nuts 20 above and below the valve, which nuts besides affording a means for adjustment secure the rubber seat to the valve.

The water connection 3 has a bronze seat ring secured in it on which seats a flat faced valve 8, which is pin-connected at 11 to a lever 9 pivotally mounted at 10, to the same side of the casing 2 as that of the valve 16.

The link-connections of both valves are such as will permit the valves to lift clear of the passage-way through the apertures they normally close. The lever 9 of the valve 8 is produced beyond the valve connection 11 and is upwardly turned to bear at 12 on the underside of a lever 13 which is pivoted at 14 on the diametrically opposite side of the casing 2 to the connections 10 and 19 of the valves. The free end of this lever 13 is turned upward into the axial line of the valve apertures and bears against the lower end of the stem 15 of the upper valve, so that when the upper or air valve 16 is held on its seat by the air pressure above it, it holds the lower valve 8 on its seat through the levers 13 and 9.

Adjacent the contact 12 of the lever 13 is a recess 21 to permit the end of the lever 9 to quickly free itself from the engagement and as the pressure on this lever is considerable, it is reinforced by webs on each side of the recess.

The lower end of this lever below the pin-connection 14 is extended as at 23 and is turned inward to adjacent the edge of the valve 8, so that when the valve opens and the lever 13 is upwardly turned, as indicated by the dotted lines, the inwardly turned end 23 projects over the seat of the valve 8 and prevents that valve again seating until it has been manually reset. The casing 2 is provided with a hand hole door 24 affording access to both chambers 6 and 7 for resetting or for examination of both valves.

To relieve the pin 11, by which the lower valve 8 is connected to its lever 9, of the pressure of the water imposed on the valve, the crown of the valve bears at 22 on the lever itself.

The chamber 7 is provided at 25 for connection to it of a draw-off pipe, which connection is a short distance above the valve so as to retain a small amount of water above the valve to more effectively hold the air and to keep the rubber in condition.

The lower chamber 6 has a connection at 26 for the electric and motor alarms which are operative when the valve is open to admit water to the sprinkler pipes of the building.

At 27 an automatically closing drip valve is connected that will drain from the chamber 6 any water leaking past the valve 8, but which will close when water is fully admitted.

The ratio between the areas of the valves 8 and 16 and the proportions of the levers 9 and 13 may be varied to meet the requirements of pressure of air in the sprinkler pipes and the water in the service mains.

In use, when the pressure of the air in the sprinkler pipes is reduced, as when any sprinklers in the building operate, the valve 16 being relieved of the air pressure on its area, is free to move up under the pressure of the service water on the underside of the valve 8, until the upper end of the lever 13 clears the end of the stem 15 and enables that lever to be moved clear of the end of the lever 9. Both valves 8 and 16 and the levers 9 and 13 are then thrown clear, as indicated by the dotted lines.

As this valve is free to open under excessive water pressure, no injury will result if the main to which the valve is connected is subject to water-hammer, which is liable to injure a valve positively held on its seat. The entrance of water past the valve 8 will merely actuate the alarms and the valves must be reset.

The features of advantage claimed for this valve are that it is moderate in size in relation to the pipes it is connected to and is compact; that it is simple and cheap to construct, having few parts and those not liable to derangement in use; that both valves and all the connected parts are readily accessible for resetting and for examination, and that passage through the valves is direct and straight.

Having now particularly described my invention, I hereby declare that what I claim as new and desire to be protected in by Letters Patent, is:

1. A dry valve for a sprinkler system, comprising a casing, one end of which is connectible with the water main and the opposite end of which is adapted for being joined with the sprinkler pipes, a valve within the casing seating from above to close the water pipe connection, another valve of larger area than the first mentioned valve seating from above to close the water passage to the sprinklers, each of the said valves being so pivoted to the casing so as to open clear of the through passage between the water inlet and the outlet to the sprinkler pipes and a single tripping lever interposed between and having engagement with the two halves, when at their closed position, whereby a less pressure on the valve of larger area maintains the tripping lever in engagement with the other valve and holds the other valve closed against a greater pressure, the said lever being adapted, when at its released position, to prevent automatic closing of the last mentioned valve after it has been opened.

2. A dry-valve for a sprinkler system, comprising the combination within a suitable casing, one end of which is connected to the water main and the other, in the same axial alinement, to the sprinkler pipes of a building, of a valve within the casing, seating from above to close the water pipe connection, a valve within the casing seating from above to close connection to the sprinkler pipes, each of said valves being pin-connected to the casing to open clear of the through passage between the water pipe connection and the sprinkler pipes connection, a lever pivotally mounted to the inside of the casing between the two valves, the free end of said lever being turned into the axis of the valves to engage a downward projection from the upper valve when the same is closed, said lever intermediate of its ends bearing on a projection connected to the lower valve to hold the same in the closed position against the pressure of the water under it, the lower end of this lever being produced beyond its pivot pin to adjacent the seat of the lower valve and adapted to project over the valve seat when the valve is open.

In testimony whereof I affix my signature.

ERNEST G. HARRIS.